United States Patent [19]
Wang et al.

[11] Patent Number: 6,005,853
[45] Date of Patent: *Dec. 21, 1999

[54] WIRELESS NETWORK ACCESS SCHEME

[75] Inventors: Weijia Wang, Sunnyvale; Dzung-Ji Lii, Santa Clara, both of Calif.

[73] Assignee: GWcom, Inc., Santa Clara, Calif.

[*] Notice: This patent is subject to a terminal disclaimer.

[21] Appl. No.: 08/942,593

[22] Filed: Oct. 2, 1997

Related U.S. Application Data

[63] Continuation of application No. 08/542,770, Oct. 13, 1995, Pat. No. 5,721,733.
[51] Int. Cl.$^6$ ........................................................ H04Q 7/00
[52] U.S. Cl. ............................ 370/332; 370/448; 370/913
[58] Field of Search ..................................... 370/279, 312, 370/313, 314, 320, 328, 329, 332, 345, 347, 348, 432, 445, 447, 448, 462; 455/466, 823.44; 340/825.47, 825.49; 379/59

[56] References Cited

U.S. PATENT DOCUMENTS

| 5,148,473 | 9/1992 | Freeland et al. . | |
|---|---|---|---|
| 5,276,680 | 1/1994 | Messenger . | |
| 5,463,672 | 10/1995 | Kage . | |
| 5,657,326 | 8/1997 | Burns et al. ............................. | 370/349 |
| 5,727,976 | 3/1998 | Thompson et al. ...................... | 370/229 |

OTHER PUBLICATIONS

Mehrotra, "Cellular Radio: Analog and Digital Systems" Artech House, p. 18 and pp. 24–27 (1994).

Stallings, "Data and Computer Communications," 2nd ed., Macmillan, pp. 296–300 (1988).

Zdunek et al., "Multiple channel inhibit multiple access eith capture," IEEE Globecom 91 Conf., pp. 536–542 (1991).

*Primary Examiner*—Ajit Patel
*Assistant Examiner*—Bob A. Phunkulh
*Attorney, Agent, or Firm*—Skjerven, Morrill, MacPherson, Franklin & Friel LLP; Edward C. Kwok; Carmen C. Cook

[57] ABSTRACT

A network access scheme enhances channel utilization under the ALOHA protocol by making use of the FM capture effect. The resulting network access scheme allows a transmitter to transmit a message simultaneously with other transmitters to a receiver without the need for retransmission when the message reaches the receiver with sufficient strength over the strengths of the other transmissions. In one embodiment, the network access scheme is applied to a wireless data network, which includes support to a two-way paging application. Another network access scheme combines the high channel utilization of the carrier sensing multi-access (CSMA) protocol with the FM capture effect to provide even higher expected channel utilization. The resulting network access scheme uses a channel access protocol ("CSMA/AT") which provides an adaptive threshold. An RF transmitter determines, using the adaptive threshold, whether or not to transmit its message. Under CSMA/AT, if the sensed power of other transmissions (RSSI) in the channel is below the adaptive threshold, the transmitter transmits; otherwise, the transmitter backs off.

40 Claims, 8 Drawing Sheets

| | | |
|---|---|---|
| Preamble 401b | Preamble 401a | |
| Frame Flag #2 0xBA 402b | Frame Flag #1 0xAB 402a | |
| VER # (2 bits) 405 | Length 0~255 403 | |
| Frame Type 406 | Scr bit | B/P bit | S/L bit | FEC bit | Link Control (4 bits) 408 | |
| Length checksum (4 bits) 404 | | |
| Pager ID encrypted by *** 407 | | |
| Pager ID encrypted by *** 409a | | |
| Pager ID (optional) encrypted by *** 409b | | |
| 409c | | |
| Base Station ID (SID) 10 bits totally 410 | Control Center ID (6 bits) 411 | |
| Sequence Number (1 byte) 412 | Application ID (1 byte) 413 | |
| User Data (0~247 bytes) 415 | | |
| CRC (2 bytes) 416 | | |
| FEC (6x bytes) 417 | | |

FIG. 4

WIRELESS NETWORK ACCESS SCHEME

This application is a continuation of application Ser. No. 08/542,770, filed Oct. 13, 1995, now U.S. Pat. No. 5,721,733, issued Feb. 24, 1998.

CROSS REFERENCE TO RELATED APPLICATIONS

The present application relates to (i) copending patent application, Ser. No. 08/543,101, filed on Oct. 13, 1995, now U.S. Pat. No. 5,721,733, entitled "Wireless Personal Mobile Terminal," by Weijia Wang et al, also assigned to General Wireless Communication Corporation, and (ii) copending patent application, Ser. No. 08/542,860, filed on Oct. 13, 1995, now U.S. Pat. No. 5,898,904, entitled "Two-way Wireless Data Network" by Weijia Wang, also assigned to General Wireless Communication.

BACKGROUND OF THE INVENTION

1. Field of the Invention

The present invention relates to wireless data communication; and, in particular, the present invention relates to network access protocols used in wireless data communication.

2. Background of the Invention

In a wireless communication network, all participants in a channel share the radio channel as a network resource. In order to have a high utilization rate, and to ensure that all participants are given a fair access to the channel, various network access protocols have been developed. Typically, the more sophisticated a channel access protocol is, the higher the channel utilization can be achieved. However, the more sophisticated a channel access protocol is, the more sophisticated transceivers and software are required to implement that protocol. As a result, the proper choice of a channel access protocol involves optimizing a scarce resource to some cost constraints.

Among wireless channel access protocols, the ALOHA protocol is amongst the simplest. Under ALOHA, each participant transmits over the channel as soon as it has a message to send. The recipient of the message sends an acknowledgement message upon successfully receiving the transmitted message. The sender of the first message waits for this acknowledgement message, and if this acknowledgement message is not received after a predetermined time period, the sender assumes that the first message was not successfully received and retransmits the first message. Because each participant transmits at will, a collision occurs whenever two or more participants attempt to transmit simultaneously. Thus, under ALOHA, the expected maximum channel utilization is 18% for a large number of channel participants.

A higher channel utilization rate can be achieved by collision avoidance. One channel access protocol that implements collision avoidance is the Carrier Sense Multiple Access (CSMA) protocol. Under the basic CSMA protocol, a transmitting station having a message to send over the common channel first "listens" for activity on the channel. If activity is detected (i.e. another participant is transmitting), then the transmitting station "backs off" for a time period before re-attempting the transmission. The main advantage of the basic CSMA protocol is the reduction of the need for retransmissions, since collisions are rare. CSMA allows channel utilization to reach as much as 50%. However, while CSMA results in a higher channel utilization, CSMA requires more sophisticated hardware to implement.

The channel access protocol in a wireless data network can be determinative of the total bandwidth of the wireless data network. For example, in a cellular digital packet data (CDPD) system, a large number of cellularized base stations are distributed all over the service area. Cellularizing the service area offers two advantages: (i) allow mobile units and base stations to transmit at higher data rate with relatively low power, since the expected distance between a mobile unit and a base station in the vicinity is short; and (ii) larger capacity is provided because base stations which are separated by large enough distances can use the same radio channels. Such a system provides thus very high capacity, low response delay and allows the mobile units to transmit at relatively high data rates. In such a system, two-way symmetrical and reliable data links can also be provided. However, such a system is expensive and complex.

In a CDPD system, because connectivity is maintained over the entire duration of a data communication session, multiple channels must be provided to allow multiple sessions to be maintained simultaneously. To locate a recipient mobile unit of a message, the network broadcasts the address of the recipient mobile unit from all the base stations in the service area until the recipient unit responds. Thus, a large amount of network resources is dedicated to locating mobile units. Further, to maintain continuous connectivity and to allow real time performance, when the session is established, the CDPD unit is associated with a base station with which it communicates. In addition, because a mobile unit can be expected to be used in a moving vehicle, it is possible that the mobile unit moves out of the service range of the initially associated base station and moves into the service range or ranges of one or more such base stations during the duration of a session. Thus, provisions must be made to disengage an associated base station and to engage an additional base station or stations ("hand off") during the course of the session. The control mechanisms for maintaining a CDPD session, including tasks typically termed "connectivity management" and "mobility management", involve sophisticated algorithms which require high performance computers to handle setting up the session, maintaining the session, and tracking the communicating mobile units as they move between service areas of the cellularized base stations. The complexity of the system requires a large investment in expensive equipment. Often, these control mechanisms are centralized, i.e. a large network switching or control center is provided to handle the mobile units in a given service area, so that, at times of heavy data traffic, the network control center may become a bottle neck, introducing undesirable latency into the system.

Another major disadvantage of the CDPD system is the requirement that the receiver of the mobile unit must be on at all times to receive messages. As a result, such a mobile unit requires a battery that is, at the present time, too undesirably bulky for mobile use. It would also be extremely difficult for power-saving features to be provided in such a mobile unit. Unlike a pager, which monitors only one paging channel, the mobile unit of a CDPD system must monitor a different radio channel when it is located in a different cell. Further, control information (e.g. timing information and recipient addresses) are broadcast by base stations in dedicated control channels. While a pager can be assigned a periodically occurring time-slot during which it "wakes" up to check for messages, a similar scheme in a mobile unit of a CDPD system would require timing in all the cellular base stations to be synchronized. Failure to synchronize all base station can lead to a mobile unit checking for the broadcast of its address during the wrong time slot.

SUMMARY OF THE INVENTION

In accordance with the present invention, a network access scheme is provided which provides, for a wireless data network, high channel utilization under the ALOHA protocol by making use of the FM capture effect. The resulting network access scheme allows a mobile transmitter to transmit a message to a cellularized base station, simultaneously with other transmitters without the need for retransmission, if the message reaches the receiver with sufficient strength over the strengths of the other transmissions. In one embodiment, multiple transmitters and multiple receivers are distributed over a geographical area, sharing the same frequency channels. In that embodiment, FM capture allows multiple messages to capture multiple receivers simultaneously, thereby enhancing the channel utilization under the ALOHA protocol. A message picked up by a base station is forwarded, either by a wired link or wireless link, to a network control center for routing or processing. The base stations are distributed over the large service area in accordance with the expected density of the wireless terminals and the physical attributes of the local terrain.

In accordance with another aspect of the present invention, a network access scheme combines the high channel utilization of the carrier sensing multi-access (CSMA) protocol with the FM capture effect to provide even higher expected channel utilization. The resulting network access protocol ("CSMA/AT") provides an adaptive threshold which is used by an RF transmitter to determine whether or not to transmit its message. If the sensed power of other transmissions in the channel, i.e. received signal strength indicator (RSSI), is below the adaptive threshold, the transmitter transmits; otherwise, the transmitter backs off. In accordance with the present invention, the adaptive threshold is adjusted according to the average RSSI in the channel over a predetermined time period.

Under CSMA/AT of the present invention, when the adaptive threshold is close to background thermal noise, the network access protocol behaves like pure CSMA. However, if the adaptive threshold is above the highest possible RSSI, the protocol behaves like pure ALOHA. The adaptive threshold allows the channel access protocol to successively accommodate continuously changing environmental conditions affecting signal transmission, such as the weather conditions, random radio interference, the number of active transmitting units and traffic.

The present invention is better understood upon consideration of the detailed description below and the accompanying drawings.

BRIEF DESCRIPTION OF THE DRAWINGS

FIG. 4 shows the format of a data packet used in one embodiment of the present invention.

DETAILED DESCRIPTION OF THE PREFERRED EMBODIMENTS

The present invention provides a channel access protocol used in conjunction with a wireless data network in which mobile wireless terminals are served by cellularized base stations distributed over a service area. Unlike cellular telephone networks, packet data network are characterized by short and bursty packets. Continuous connectivity in a packet data network is thus not necessary. Therefore, connectivity and mobility management tasks performed in cellular telephone services are unnecessarily complex when applied to a packet data network. In fact, in the wireless data network of the present invention, the same frequency channel can be shared by each and every cell. In this description, a cell is defined as the local service area of a base station. Accordingly, antenna spatial diversity is an inherent advantage in the wireless data network of the present invention. That is, when a wireless terminal transmits, the multipath signal, which may constructively or destructively interfere at a base station, can be received by more than one base station.

Under the network access scheme described below, a wireless terminal is not required to be associated with a base station in order to communicate. That is, the wireless terminal does not identify the base station to which it transmits a message, nor is it informed of the base station from which it receives a message. Therefore, under of the present invention, no connectivity or mobility management tasks need performed. In addition, the channel access protocol of the present invention allows additional base stations, and therefore additional bandwidth, be added without the complexity relating to adjustments of frequency assignment at adjacent base stations.

Figure 1:
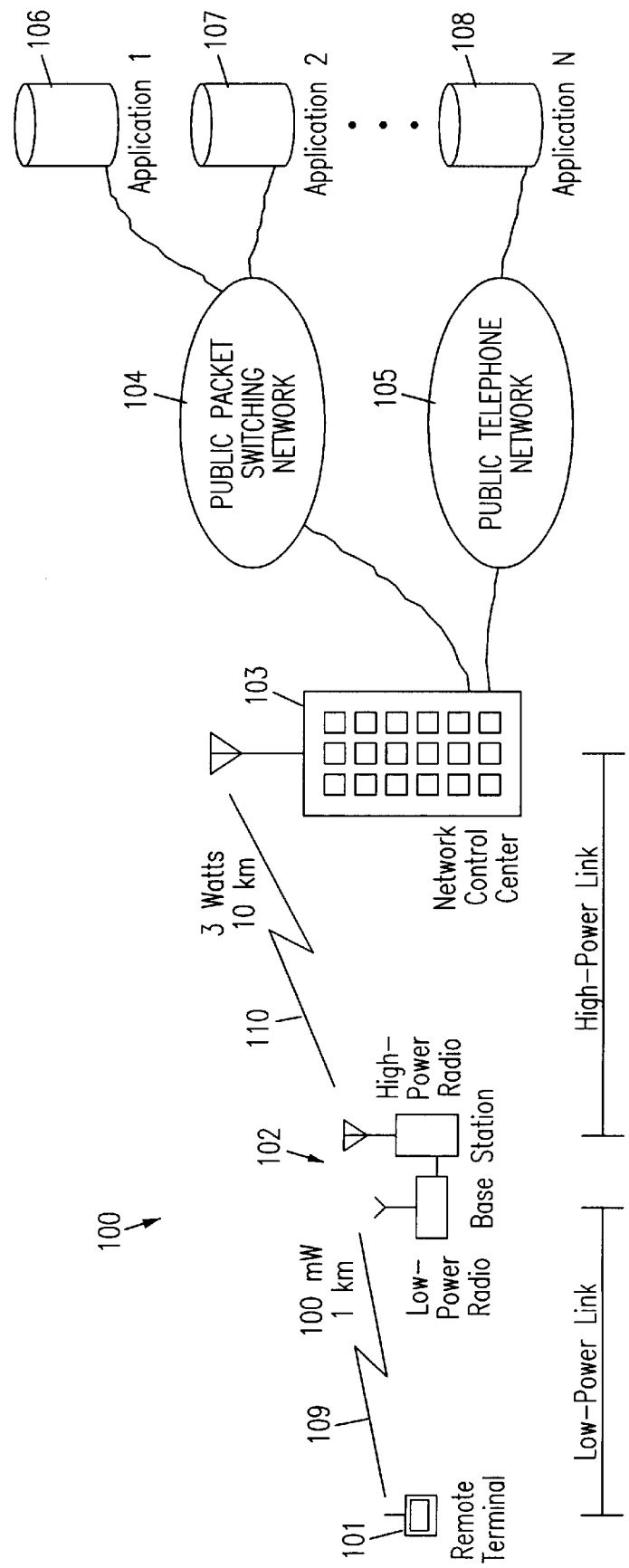
FIG. 1 shows a wireless data network in which an embodiment of the present invention is implemented.

One embodiment of the present invention is provided in the data network shown in FIG. 1. As shown in FIG. 1, a data network 100 includes (i) a large number of wireless terminals, represented in FIG. 1 by wireless terminal 101, (ii) a relatively smaller number of base stations, represented in FIG. 1 by base station 102, distributed throughout the service area of wireless data network 100, each base station serving a relatively small portion of the service area of wireless data network 100 within its immediate vicinity and (iii) a network control center 103, which is coupled through public packet switching network 104 and public telephone network 105 to information or communication applications. Information or communication applications represents sources or recipients of information, such as providers of news, stock quotations, weather information, credit verification bureaus, or an inventory control system. Of course, even though network control center 103 is shown coupled only two kinds of public data networks (i.e. a packet switching network and a public telephone network), these public data networks serve only as examples for the purpose of illustration. Clearly, network control center 103 can be coupled to any data network.

One application of wireless data network 100 is a two-way paging system, which is built on top of an existing one-way paging system. Such an application is discussed in detail in the copending patent application entitled "Two-way Wireless Data Network" by Weijia Wang, which is incorporated by reference above. In that application, wireless terminal 101 can be implemented by a personal mobile terminal, such as that disclosed in the copending patent application entitled "Wireless Personal Mobile Terminal", by Weijia Wang et al, which is incorporated by reference above. In the two-way paging application, paging messages for wireless terminal 101 are primarily received from high power transmitters which broadcast over the entire service area of wireless data network 100. In this embodiment, wireless terminal 101 is compatible with existing one-way paging services in that it can receive messages of such existing services. Thus, the high power transmitters from which two-way pager 101 receive messages can be transmitters of existing one-way paging services. Wireless terminal 101 can transmit messages designated for other like wireless terminals. Such messages are transmitted from the wireless terminal 101 on a channel 109 separate from that of the high power transmitters of the one-way paging services. The message sent from two-way pager 101 is received at the closest base station in its vicinity, indicated in FIG. 1 by base station 102. As mentioned above, wireless terminal 101 has no knowledge of which of the numerous base stations processes its transmission. In fact, more than one base station can receive wireless terminal 101's transmission. However, because wireless terminal 101 need only have power to reach a local base station, wireless terminal 101 can be made with low power consumption, which is very desirable for mobile applications, such as paging.

An acknowledgement message is then sent from base station 102 over channel 109, which also forwards the received message over another channel 110 to network control center 103. In one embodiment, the communication link 110 between network control center 103 and the base station uses a TCP/IP protocol. Because the communication link 110 is not "local", the power of transmission from the base station on communication link 110 is necessarily higher than the power of transmission over channel 109. As mentioned above, since it is possible that multiple base stations may receive the same message, each base station selects a random delay to acknowledge the message received. Alternatively, the delay can also be selected according to the power at which the message is received, i.e. shorter delay is chosen for a message received at higher power, which indicates wireless terminal 101 sending the message is likely to be nearby. Since the power at which the acknowledgement message is transmitted by the base station is higher than the power at which wireless terminal 101 transmits its message, this acknowledgement message is received by all the other base stations receiving wireless terminal 101's message. Upon receiving this acknowledgement message, all the other base stations abort further processing of wireless terminal 101's message, including its own acknowledgement, since wireless 101's message is already being handled by the first base station to acknowledge.

Since the acknowledgement message is sent over the same channel as wireless terminal 101's message, the acknowledgement message may collide with other traffic on the channel when the instant channel utilization is high. The present embodiment provides a congestion control mechanism via the acknowledgement traffic. Namely, the back-off period resulting from a collided acknowledgement message follows the exponential binary back-off algorithm, i.e. each successive retransmission of the acknowledgement packet is delayed by twice the immediately previous delay.

As discussed above, communication link 109 between wireless terminal 101 and base station 102 needs only be a low-power station (e.g. 100 mW) to cover a local area of 1 Km radius, for example. On the other hand, link 110 between base station 102 and network control center 103 is required to be relatively higher power (e.g. 3 watts) to be able to reach network control center 103, which can conceivably be more than a few kilometers away. Upon receiving this message from base station 102, network control center 103 notifies the recipient wireless terminal of the message by paging the recipient wireless terminal in substantially the same manner as the manner a network control center of a one-way paging service sends a paging message it receives over the telephone network. The recipient wireless terminal then responds to this page, requesting the message from wireless terminal 101, by transmitting the request over a communication link similar to communication link 109. As with wireless terminal 101's message, a base station forwards the request for message over a communication link similar to communication link 110. Upon receiving this request for message, network control center 103 now learns the position of the recipient wireless terminal (i.e. the base station with respect to which this recipient wireless terminal is closest) and delivers wireless terminal 101's message through this closest base station, over the two communication links 110 and 109. In this manner, wireless terminal 101's message is not constrained by the format and bandwidth limitations of the one-way paging service and yet the two-way paging application thereby achieved does not require that network control station execute a sophisticated search for the recipient of wireless terminal 101's message. If such sophisticated search had been required, it would have had to use sophisticated algorithms such as those used in CDPD described above.

Base stations in wireless data network 100 are distributed according to the expected utilization rate, the expected number of users in the vicinity and the expected transmission power of the wireless terminals. Because the local service area of a base station is small, two base stations separated by a distance such that their local service areas are non-overlapping can handle messages sent by wireless terminals in their respective local service areas simultaneous. At the same time, because more than one base station can pick up a message from a wireless terminal, a wireless terminal sending a message can conceivably tie up more than one base stations which receive the message. The present invention provides a network access protocol based on an frequency modulation (FM) phenomenon called "FM capture," in conjunction with either the ALOHA protocol, the CSMA (carrier sensing multiple access) protocol, or similar channel access protocols, to achieve a high channel utilization. FM capture is a property of a FM receiver which allows the FM receiver to lock onto the strongest signal among several simultaneously transmitted signals of the same carrier frequency. The strongest signal is said to "capture" the receiver. The term "FM capture ratio" refers to the minimum ratio of the power of the strongest signal, i.e., the signal which captures the receiver, to the total power of all the other signals present. The FM capture ratio that can be achieved with a typical FM receiver is on the order of three to six decibels. The resulting channel access protocol of the present invention allows base stations with overlapping local services areas to process messages originating from different wireless terminals within the overlapping local services areas of the base stations, thereby further increasing the available bandwidth of the wireless data network.

Figure 2:
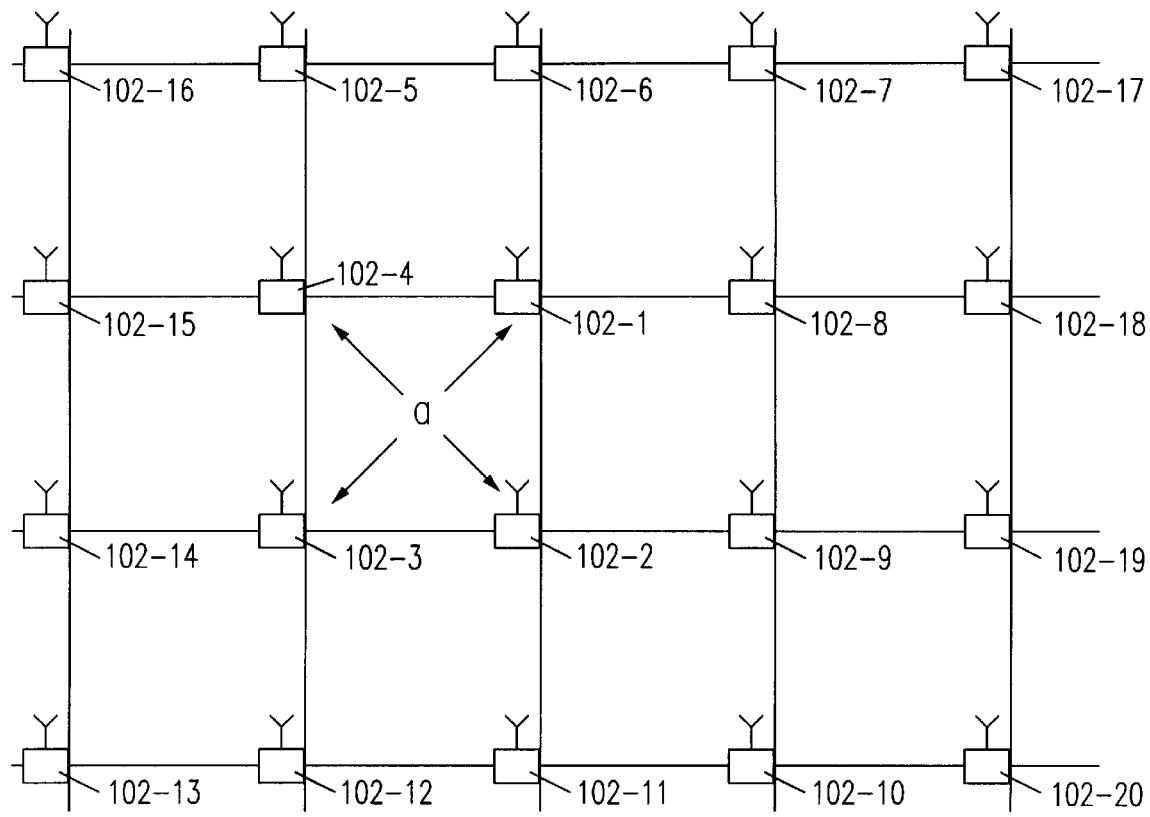
FIG. 2 provides an idealized model of base station distribution in wireless data network 100.

FIG. 2 provides an idealized model of base station distribution in wireless network 100. As shown in FIG. 2, base stations 102-1 to 102-20 are positioned at regular intervals on a rectangular grid. Of course, any actual implementation will, in all likelihood, deviate substantially from this idealized configuration. FIG. 2 provides illustratively the principles of the present invention, which are equally applicable in any actual implementation, even though such implementation may deviate substantially from the configuration shown in FIG. 2. In the present embodiment, it is understood that the base stations of wireless data network is to be distributed initially substantially evenly.

The strength of a radio signal propagating over land is known to attenuate at a faster rate than the square of the distance from the transmitting source. In an urban area, where higher attenuation of RF energy is typical, the strength of such signal may actually attenuate as the fourth power of such distance. Thus, referring to FIG. 2, a two-way pager located slightly off the location labelled "a", which is equidistance from base stations 102-1 to 102-4, will result in a significant difference in strengths of the received signals at two of base stations 102-1 to 102-4. This effect can be combined with the FM capture effect to allow the messages of two wireless terminals situated within a relatively short distance (e.g. less than the radius of a base station's local service area) of each other to be handled by two base stations with overlapping local service areas.

Due to the FM capture phenomenon discussed above, simultaneous transmissions of two or more messages in the same radio channel may result in such messages being received by different base stations in the vicinity, such that retransmission of all (or even some) of the messages are not required. For example, in the case of simultaneous transmissions of two messages from two different wireless terminals, retransmission of either message may not be required if that message is close enough to one base station to capture that base station. In fact, if it happens that the messages each capture a different base station, even though these base stations have overlapping local service areas, neither message need to be retransmitted. Thus, due to this minimized need for retransmission, by combining the use of the FM capture effect with a channel access protocol, one can increase the expected channel utilization. The use of the FM capture effect is particular effective in an urban environment, where the power of an RF signal attenuates as rapidly as the fourth power of distance.

Hence, in accordance with the present invention, a network access scheme which enhances channel utilization under a channel access protocol, such as the ALOHA protocol, is achieved by making use of the FM capture effect. The resulting network access scheme allows a transmitter to transmit its message to a receiver simultaneously with other transmitters without the need for retransmission, if the message reaches the receiver with sufficient strength over the strengths of the other transmissions. When multiple transmitters and multiple receivers are distributed over a geographical area, FM capture allows multiple messages to capture multiple receivers simultaneously, thereby enhancing the channel utilization under a channel access protocol such as ALOHA.

Alternatively, the high channel utilization of CSMA can also be combined with the FM capture effect to provide even higher expected channel utilization. The resulting network access protocol ("CSMA/AT") provides an adaptive threshold which is used by an RF transmitter to determine whether or not to transmit its message. If the sensed power of other transmissions ("received signal strength indicator" or RSSI) in the channel is less than the adaptive threshold, the transmitter transmits; otherwise, the transmitter backs-off. In the present embodiment, RSSI is obtained by sampling the output value of an analog-to-digital (A/D) converter of an RF receiver at predetermined time intervals. The RSSI thus sensed is stored in a register ("RSSI register") for the channel access protocol software to reference. In accordance with the present invention, the adaptive threshold is adjusted periodically to follow the sensed RSSI.

Under CSMA/AT of the present invention, when the adaptive threshold is set close to background thermal noise, the network access protocol behaves like pure CSMA. However, if the adaptive threshold is set above the highest possible RSSI, the protocol behaves like pure ALOHA.

Figure 3:
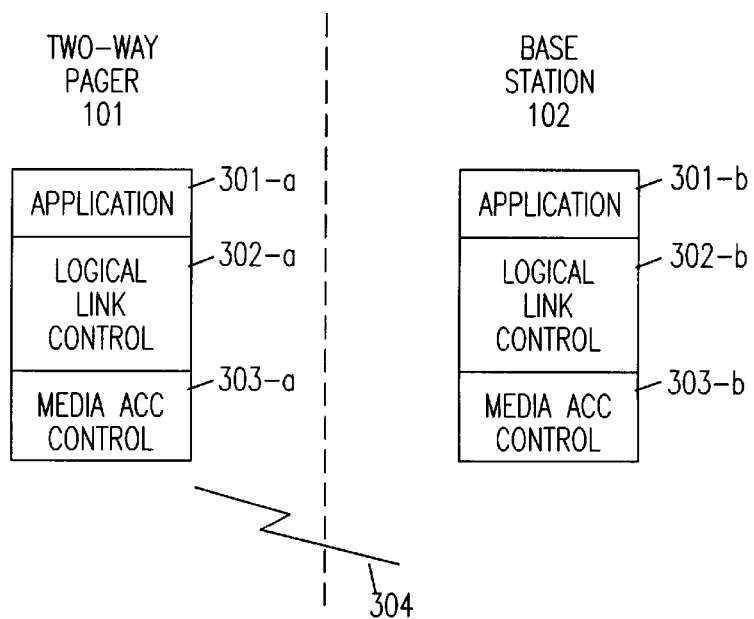
FIG. 3 illustrates, to achieve the network access protocol of the present invention, two conceptual layers of communication control mechanisms are provided.

In the present embodiment, wireless terminal 101 of wireless data network 100 transmits, according to either CSMA with fixed threshold (CSMA/FT), CSMA/AT or ALOHA, to base station 102 in the vicinity. Base station 103 returns an acknowledgement message using substantially the same method as wireless terminal 101 in sending its message. To achieve this network access scheme, two conceptual layers of communication control mechanisms are involved, as illustrated in FIG. 3. FIG. 3 illustrates that, when an application program, e.g. represented by application program 301-$a$, wishes to send a message, the message is broken down into fixed-size data packets, which are provided packet by packet to logical link control layer 302-$a$. (In the first implementation, each message is contained entirely within one packet, so that the term "packet" and "message" can be used interchangeably in this description). In turn, logical link control (LLC) layer 302-$a$ provides each data packet byte by byte to media access control (MAC) layer 303-$a$. MAC layer 303-$a$ controls a universal asynchronous receiver/transmitter (UART) circuit which serializes the byte to a stream of bits and passes on each bit serially to an RF transceiver. The RF transceiver codes and transmits each bit into channel 304, according to the accepted modulation method for the channel. When the bit arrives at base station 102, the reversed path is taken, i.e. an RF receiver decodes each bit received and passes the bit on to a UART circuit controlled by MAC layer 303$b$. Using the UART circuit, MAC layer 303$b$ reassembles the received bits into bytes, which are then passed byte by byte to LLC layer 302-$b$, where the bytes are reassembled into data packets. LLC layer 302-$b$ then passes the data packets, packet by packet, to an application program 301-$b$ which reconstructs the message transmitted by application 301-$a$. In this embodiment, each data packet is acknowledged by an acknowledgement packet individually.

Thus, in one embodiment, the channel access protocols governing the transmission over a common radio channel are controlled, in each wireless terminal or base station, by five state machines: 1) a channel state machine; 2) a MAC transmit (TX) state machine; 3) a MAC receive (RX) state machine; 4) an LLC TX state machine and 5) an LLC RX state machine. In this embodiment, the channel state machine can be one of three state machines implementing respectively the ALOHA, the CSMA/FT, and the CSMA/AT protocols.

FIG. 4 shows the format of a data packet 400 used in the present embodiment. As shown in FIG. 4, each data packet includes three bytes of preamble, indicated generally by reference numerals 401a and 401b. The bit-pattern in the preamble allows a UART circuit to align the bits in the data packet at the byte boundary. Due to the inherent lack of reliability in an RF link, the relatively lengthy three-byte preamble is used. Following the preamble is a two-byte "frame flag", indicated in FIG. 4 generally by reference numerals 402a and 402b, which is a predetermined pattern indicating the beginning of a frame. Again, because of the inherent unreliable nature of an RF link, the relatively lengthy two-byte frame flag is used. A one-byte message length field 403 is then provided. Message length field 403 indicates the number of bytes in the remainder of data packet 400 following message length field 403. (Note that, in this embodiment, to conform to the formats used by conventional one-way paging services, the message length of a data packet received from a one-way paging service is limited to 128 bytes.) Following message length field 403 is a byte including (i) a 4-bit checksum field 404 derived from the value of message length field 403 (In this embodiment, the value in checksum field 404 is derived by taking the complement of the sum (with carry) of the higher and lower nibbles of the value in message length field 403.), (ii) a 2-bit version number 405, which allows additional data packet formats to be adopted over time, and (iii) a 2-bit frame type value 406, which can be used by an application to distinguish various data formats. If the values of message length field 403 and checksum field 406 are consistent, it is assumed that the beginning of a data packet is detected. A 4-bit nibble 407 is then provided including (i) a scrambled bit, indicating that data packet 404 is scrambled; (ii) a b/p bit, indicating whether the packet originates from a wireless terminal or a base station; (iii) a s/l ID bit, indicating whether the ID field to follow (i.e. ID field 409 below) is provided in short format (4-byte) or long format (6-byte); and (iv) a frame error code (FEC) bit indicates whether an error correcting code for the frame is provided at the end of data packet 400. The next four bits form a logical link control information field 408, for providing link control information. Link control information field 408 can be used to indicate whether or not the data packet is an acknowledgement message, a data packet requiring an acknowledgement, or a data packet not requiring an acknowledgement.

ID field 409 (shown generally in FIG. 4 as fields 409a, 409b and 409c), which identifies the sender of the data packet, follows link control information field 408. Depending on the s/l bit of field 407, discussed above, ID field 409 can be four or six bytes. The 4-byte ID is used whenever the sender's 6-byte identification has two leading zeroed bytes. A 10-bit base station ID 410 and a 6-bit network control center ID 411 follow ID field 409. Base station ID 410 and network control center ID 411 identify, respectively, the base station from which data packet 400 originates (this field is zero if the sender is not a base station) and the message control center to which data packet 400 is sent. The next two bytes are respectively a one-byte sequence number field 412, to specifically identify the position of data packet 400 in a multiple-packet message, and an application field 413, to indicate the application program responsible for data packet 400. A variable length (0–247 bytes) user data field 415 then follows. Two bytes of cyclic redundancy checksum (field 416) are then provided for the recipient to determine the integrity of data packet 400 received. If FEC bit in nibble 407 is set, a fixed number of FEC bytes follows to allow error recovery.

Figure 5A:
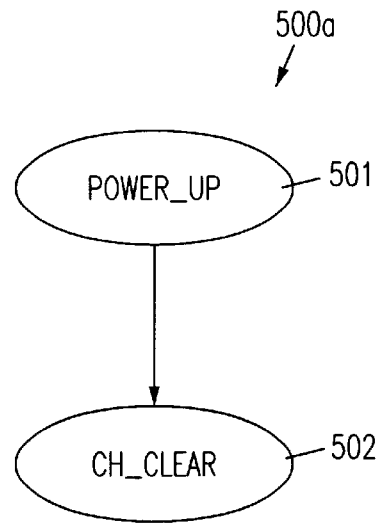
FIGS. 5a, 5b and 5c show, respectively, channel state machines 500a, 500b and 500c for the ALOHA, CSMA/FT, and CSMA/AT protocols implemented in both the wireless terminals and the base stations, in one embodiment of the present invention.
Figure 5B:
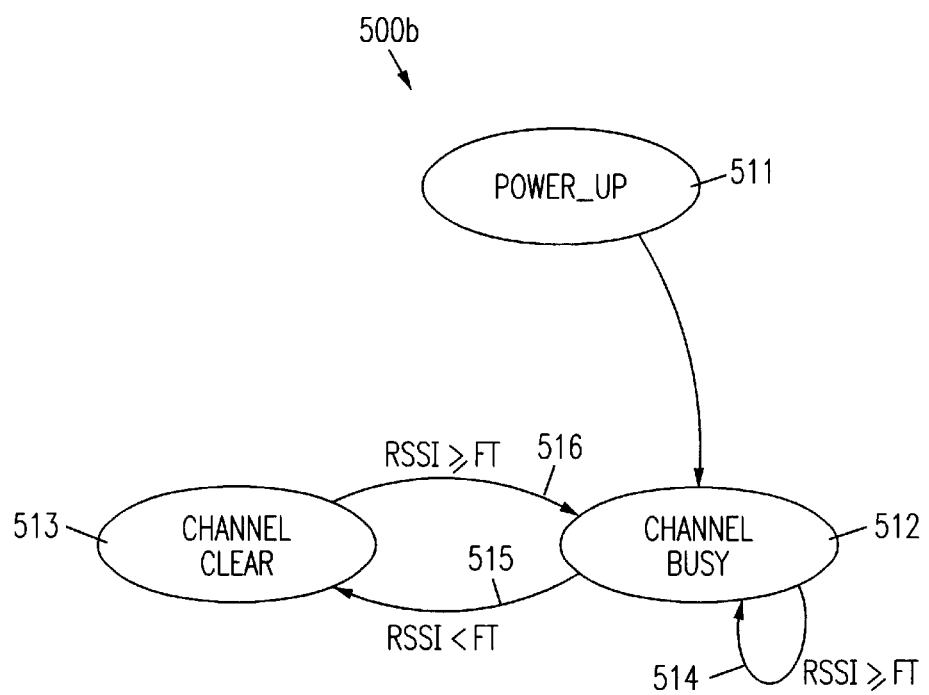
Figure 5C:
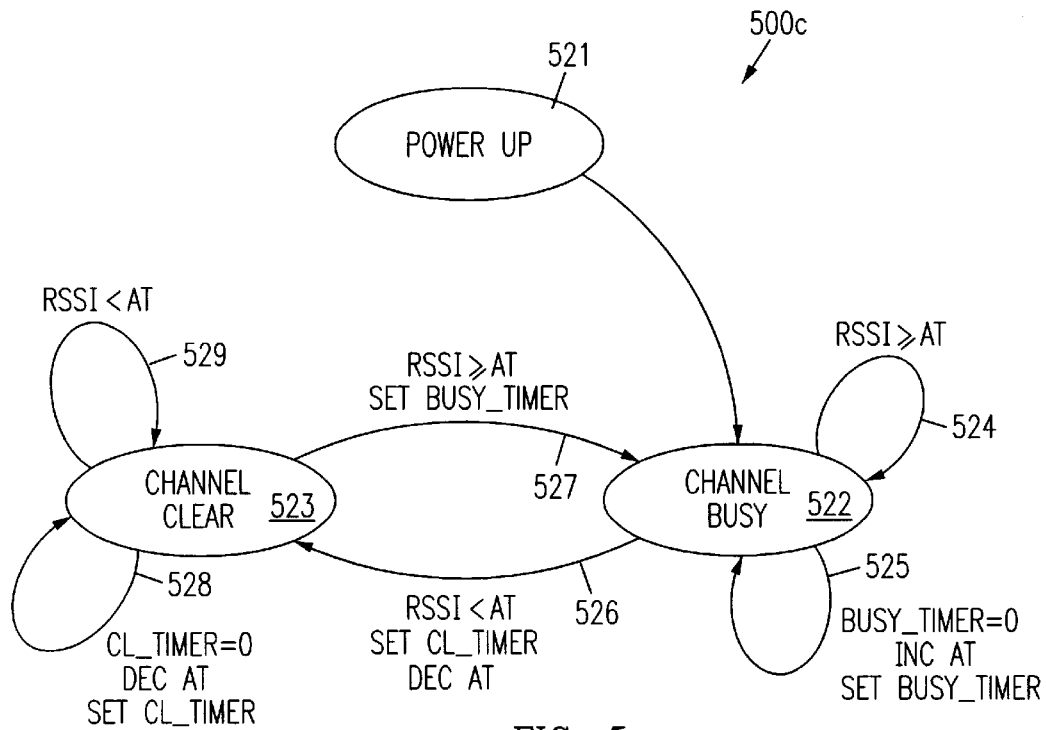

FIGS. 5a, 5b and 5c show, respectively, channel state machines 500a, 500b, and 500c for the ALOHA, CSMA/FT, and CSMA/AT protocols implemented. As shown in FIG. 5a, under the ALOHA protocol, channel state machine 500a has the power_up state 501 and the channel_clear state 502. The ALOHA protocol has the simplest state machine. Upon power up, power_up state 501 is entered. Upon initialization, channel_clear state 502 is entered from which data packets are transmitted and received. Error recovery, such as retransmission, or NAck packets, (e.g. packets requesting retransmission) are handled at the logical link control layer.

FIG. 5b shows channel state machine 500b for the CSMA/FT protocol. Channel state machine 500b for the CSMA/FT protocol operates under three states: power_up state 511, channel_busy state 512, and channel_clear state 513. Upon power up, channel state machine 500a is in power_up state 511. Upon initialization, in which the fixed threshold ("FT") is loaded into a register ("threshold register"), channel state machine 500b enters channel_busy state 512. The RSSI register is periodically updated by sampling the RSSI output of the RF transceiver. In channel_busy state 512, which indicates that the channel is unavailable, the updated RSSI value in the RSSI register is compared to FT in the threshold register. If RSSI≧FT (event 514), channel state machine 500b remains in channel_busy state 512. Otherwise, i.e. RSSI<FT (event 515), the channel state machine enters channel_clear state 513, which indicates that the channel is available for packet transmission. While in channel_clear state 513, the RSSI value in the RSSI register is periodically compared with FT in the threshold register. If RSSI≧FT (event 516), the channel state machine returns to the channel_busy state 516.

FIG. 5c shows channel state machine 500c for the CSMA/AT protocol, which includes power_up state 521, channel_busy state 522, and channel_clear state 523. Upon power up, channel state machine 500c is in power_up state 521. In this state machine, two timers: a "clear" timer and a "busy" timer are provided to schedule updates of the value (i.e. the adaptive threshold or "AT") in the threshold register. In power_up state 521, upon initialization, the busy timer is set, and the initial value for AT is loaded into the threshold register. In this embodiment, the initial value of AT is chosen to be the smaller of either the maximum allowable RSSI value (RSSIMAX), or the sum of the current RSSI value in the RSSI register plus a margin ("STD"). In this embodiment STD is obtained by taking the standard deviation of twenty readings of the RSSI register. Channel_busy state 522 is then entered.

In channel_busy state 522, the RSSI value is periodically compared with AT. If RSSI≧AT (event 524), the channel state machine remains in channel_busy state 522. Whenever the busy timer times out, AT is updated by the smaller of either RSSIMAX, or the sum of the current RSSI value in the RSSI register plus STD. The busy timer is then set to schedule the next update of AT. When RSSI<AT (event 526), channel_clear state 523 is entered. The clear timer is set to schedule an update of AT.

In channel_clear state 523, data packets can be sent. Channel state machine 500c remains in channel_clear state 523 as long as RSSI<AT (event 529). In channel_clear state 523, when clear timer times out, the value of AT is decremented by 1, and the clear timer is reset to schedule the next update of AT. When RSSI≧AT (event 527), channel_busy state 522 is entered. The busy timer is then scheduled for the first update of AT in channel_busy state 522.

Figure 6A:
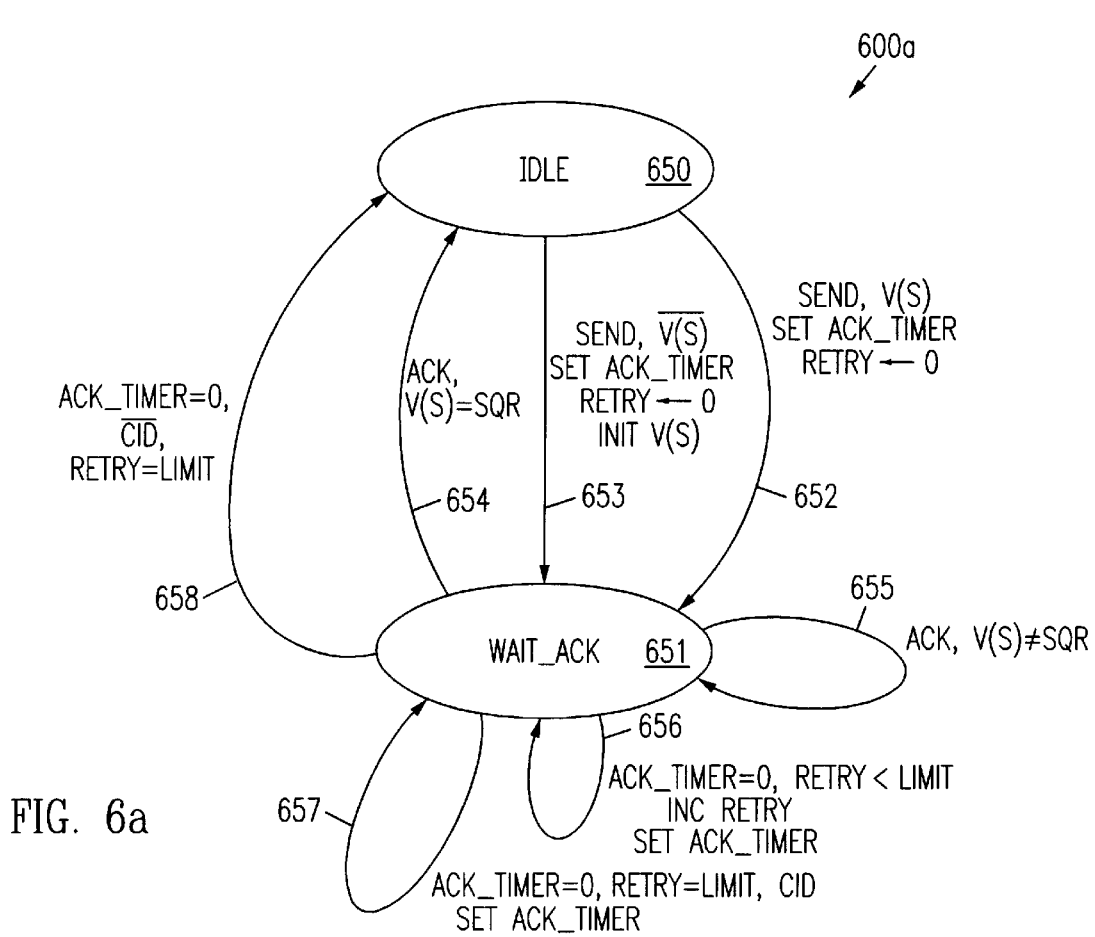
FIG. 6a shows a LLC transmit (TX) state machine 600a implemented in a wireless terminal in one embodiment of the present invention.

FIG. 6a shows LLC TX state machine 600a for a wireless terminal. LLC TX state machine 600a has two states: idle state 650, which indicates the logical link is waiting for a data packet, and wait_ack state 651, which indicates that a packet is sent and LLC TX state machine 600a is expecting an acknowledgement packet. Idle state 650 is left when a send request is received for a packet bearing either a non-zero sequence number (event 652) or a sequence number of zero (event 653). Under event 653, i.e. if the sequence number is zero, the packet begins a new sequence, and a sequence variable ("V(s)")is allocated. Under event 652, i.e. if the sequence number is non-zero, V(s) is already allocated, and V(s) is updated to take the value of the sequence number. Before exiting idle state 650, the data packet of the send request is sent, a variable "retry" is zeroed, and an acknowledgement timer is set, to prevent waiting in wait_ack state 651 indefinitely. The retry variable keeps track of the number of attempts to re-send a packet.

In wait_ack state 651, if an acknowledgement packet is received, the sequence number on the acknowledgement packet is compared to the current value of V(s). If the sequence number on the acknowledgement packet matches the value of V(s) (event 654), the expected acknowledgement is received and LLC TX state machine 600a increments V(s) and returns to IDLE state 650. However, if the sequence number on the acknowledgement packet does not match the value of V(s) (event 655), the acknowledgement packet is either corrupted or corresponds to an older packet, LLC TX state machine 600a remains in wait_ack state 651. When the acknowledgement timer times out, an error in transmission is assumed. If the number of retries is not exhausted (i.e. the value of the retry variable is less than a predetermined limit), i.e. at event 656, the packet with the pending acknowledgement is re-sent, the retry variable is updated and the acknowledgement timer is reset to schedule for the next retry. The acknowledge timer is provided a random value, as a measure of collision avoidance. If, however, the number of retries has reached the predetermined limit, LLC TX state machine 600a attempts to re-send the packet to an alternative message control center (event 657), by placing a new value in network control center ID field 411 of the data packet. If no such alternative network control center is available, error recovery must be handled by the application level software. Thus, LLC TX state machine 600a deletes V(s) and returns to idle state 650.

Figure 6B:
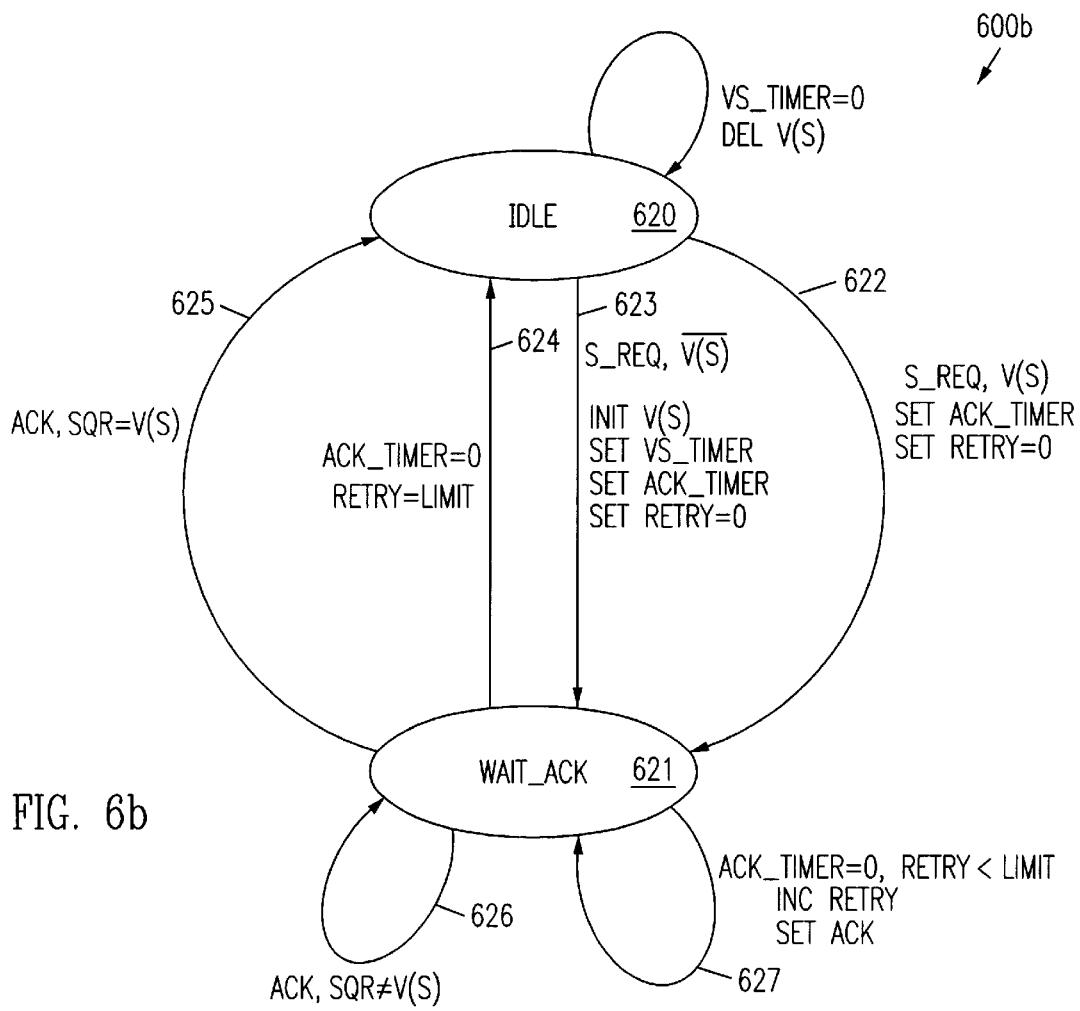
FIG. 6b shows a LLC transmit (TX) state machine 600b implemented in a base station in one embodiment of the present invention.

FIG. 6b shows LLC TX state machine 600b for a base station. Like LLC TX state machine 600a for the wireless terminal above, LLC TX state machine 600b for the base station has two states: idle state 620, which indicates the logical link is waiting for a data packet, and wait_ack state 621, which indicates that a packet is sent and LLC TX state machine 600b is expecting an acknowledgement packet. Idle state 620 is left when a send request is received for a packet bearing either a non-zero sequence number (event 622) or a sequence number of zero (event 623). Under event 623, i.e. if the sequence number is zero, the packet begins a new sequence, and a sequence variable V(s) is allocated. At the same time, a life time timer for V(s) ("Vs_timer") is set to limit the wait for additional packets in the sequence. If the Vs_timer times out in idle state 620, V(s) is deleted. Under event 622, i.e. if the sequence number is non-zero, V(s) is already allocated, and V(s) is updated to take the value of the sequence number. Before exiting idle state 620, the data packet of the send request is sent, a variable "retry" is zeroed, and an acknowledgement timer set, to prevent waiting in wait_ack state 621 indefinitely. The retry variable keeps track of the number of attempts to send a packet.

In wait_ack state 621, if an acknowledgement packet is received, the sequence number on the acknowledgement packet is compared to the current value V(s). If the sequence number on the acknowledgement packet matches the value of V(s) (event 625), the expected acknowledgement is received and LLC TX state machine 600b increments V(s), resets the Vs_timer and returns to IDLE state 620. However, if the sequence number on the acknowledgement packet does not match the value of V(s) (event 626), the acknowledgement packet is either corrupted or correspond to an older packet, LLC TX state machine 600b remains in wait_ack state 621. When the acknowledgement timer times out, an error in transmission is assumed. If the number of retries (i.e. the value of the retry variable is less than a predetermined limit), i.e. at event 627, the packet with the pending acknowledgement is re-sent, the retry variable is updated and the acknowledgement timer is reset to schedule for the next retry. If, however, the number of retries has reached the predetermined limit, LLC TX state machine 600b returns to idle state 620.

Figure 7A:
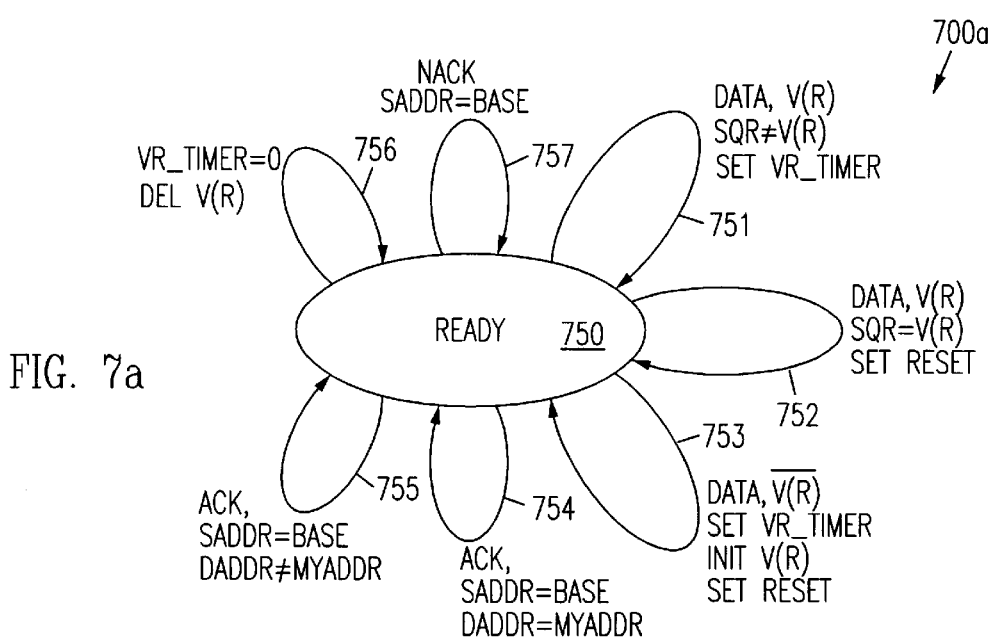
FIG. 7a shows a LLC receive RX state machine 700a implemented in a wireless terminal in one embodiment of the present invention.

FIG. 7a shows LLC RX state machine 700a for a wireless terminal. LLC RX state machine 700a has a single state: ready state 750. In ready state 750, if a data packet arrives bearing a sequence number of zero (event 753), a new sequence is deemed begun, and LLC RX state machine 700a (i) sends an acknowledgement packet to this received data packet, (ii) resets the MAC RX state machine, (iii) allocates a sequence variable ("V(r)"), (iv) sets a variable life_time timer ("Vr_timer"), which limits the life time of the sequence variable, and (v) passes the received packet to the application software. When Vr_timer times out, i.e. event 757, V(r) is deleted. If the data packet bears a non-zero sequence number and V(r) is already allocated, the sequence number of the received data packet is compared with V(r). If the received sequence number of the data packet matches V(r), i.e. event 752, the data packet is a retransmission of the previous received data packet. Event 752 occurs when the previous acknowledgement packet is not received by the sender. Thus, LLC RX state machine 700a sends an acknowledgement packet to the received data packet and resets MAC RX state machine 900a (described below). If, however, the received sequence number of the data packet does not match V(r), i.e. event 751, LLC RX state machine (i) sends an acknowledgement packet to this received data packet, (ii) updates V(r) with the current sequence number, (iii) resets the VR_timer, and (iv) passes the received packet to the application software.

If an acknowledgement packet or a negative acknowledgement ("NAck") packet is received, LLC RX state machine 700a checks if the acknowledgement is sent from a base station (i.e. base station ID field 410 is non-zero). If so, i.e. events 754, 755 and 757, the message control center ID field 411 is recorded (for use by LLC TX state machine 600a in wait_ack state 657), If further, the acknowledgement packet's destination address is the address of the wireless terminal (i.e. event 754), the received acknowledgement packet is passed to LLC TX state machine 600a.

Figure 7B:
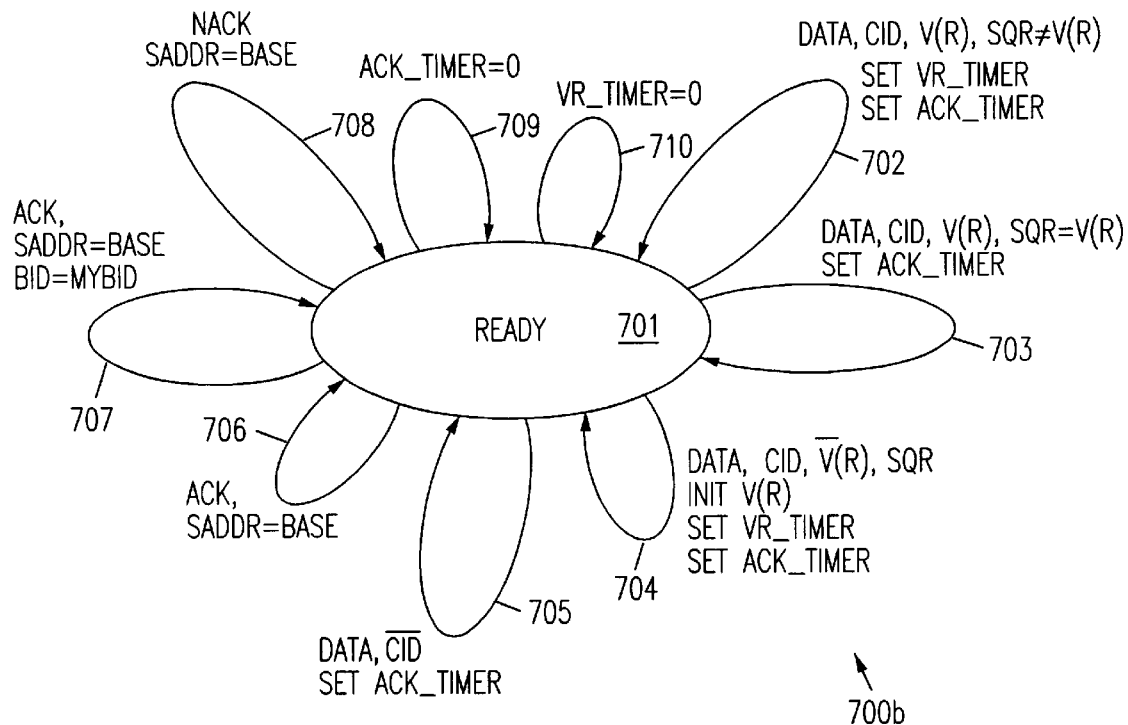
FIG. 7b shows a LLC receive RX state machine 700b implemented in a base station in one embodiment of the present invention.

FIG. 7b shows LLC RX state machine 700b for a base station, which also has a single state: ready state 701. In ready state 701, if a data packet arrives bearing a sequence number of zero and designates in network control center ID field 411 the network control center associated with this base station (event 704), a new sequence is deemed begun, and LLC RX state machine 700b (i) prepares an acknowledgement packet to this received data packet, (ii) sets the Ack_timer, (iii) allocates V(r), (iv) sets Vr_timer, and (v) passes the received packet to the application software. The Ack_timer is provided a random delay of 0 to 7 transmit times of an acknowledgment packet. The acknowledge packet, or any packet prepared by this LLC RX state machine, is actually sent when the Ack_timer times out (event 710) When Vr_timer times out, i.e. event 710, V(r) is deleted. If the data packet bears a non-zero sequence number and V(r) is already allocated, the sequence number of the received data packet is compared with V(r). If the received sequence number of the data packet matches V(r), i.e. event 703, the data packet is a retransmission of the previous received data packet. This event arrives when the previous acknowledgement packet did not arrive the sender. Thus, LLC RX state machine prepares an acknowledgement packet to the received data packet and resets the Ack_timer. If, however, the received sequence number of the data packet does not match V(r), i.e. event 702, LLC RX state machine 700b (i) sends an acknowledgement packet to this received data packet, (ii) updates V(r) with the current sequence number, (iii) resets the VR_timer, and (iv) passes the received packet to the application software.

If the received data packet designates in network control center ID field 411 a network control center not associated with this base station (event 705), LLC RX state machine 700b prepares a NACK packet reporting this error and sets the Ack_timer.

If an acknowledgement packet or an NAck packet is received, LLC RX state machine 700b checks if the acknowledgement is sent from a base station (i.e. base station ID field 410 is non-zero). If so, i.e. events 706, 707 and 708, LLC RX state machine 700b removes the entry in pending acknowledgement or negative acknowledgement matching this acknowledgement or NACK packet. If further, the acknowledgment packet's destination address is the address of the wireless terminal (i.e. event 707), the received acknowledgement packet is passed to LLC TX state machine 600b.

Figure 8A:
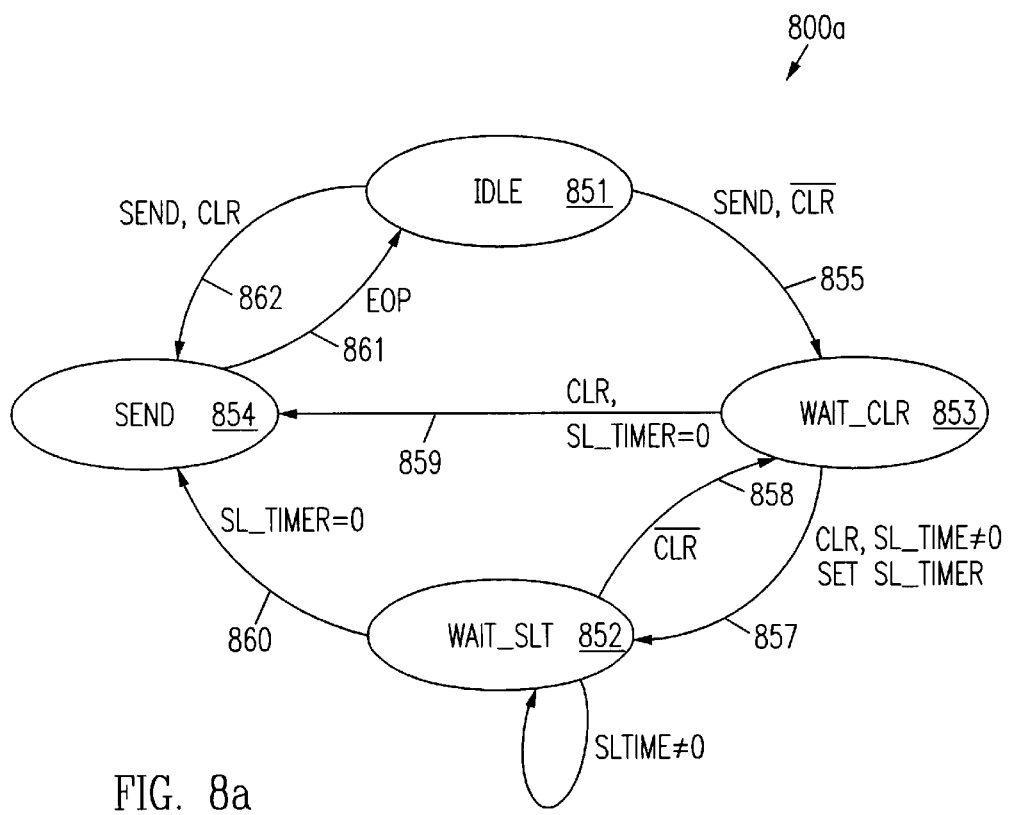
FIG. 8a shows a MAC TX state machine 800a implemented in a wireless terminal in one embodiment of the present invention.

FIG. 8a shows MAC TX state machine 800a for a wireless terminal. As shown in FIG. 8a, MAC TX state machine 800a includes four states: (i) idle state 851, in which MAC TX state machine 800a waits for a data packet to transmit, (ii) wait_clear state 853, in which MAC TX state machine 800a waits for a busy channel to clear, (iii) wait_slot state 852, in which MAC TX state machine 800a waits for the assigned time slot, and (iv) send state 854, in which MAC TX state machine 800a transmits a data packet. In idle state 851, if a send request is received and the channel is clear, i.e. event 862, MAC RX state machine 800a is reset, and the send request is executed by MAC TX state machine 800a entering send state 854. (Whether the channel is clear depends on whether MAC TX state machine 800a is in channel_busy state 512 or 522, or channel_clear state 502, 513 or 523). Alternatively, if the send request arrives when the channel is busy, i.e. event 855, MAC TX state machine 800a enters wait_clear state 853. In wait_clear state 853, to avoid collisions when the channel becomes clear, a random time slot number (0–10) is picked, and a slot timer is set based on the picked slot number. If the channel becomes clear prior to the slot timer times out, MAC TX state machine 800a goes to wait_slot state 852. In wait_slot state 852, if the channel becomes busy again (event 858), MAC TX state machine 800a returns to wait_clear state 853; otherwise, when the slot timer times out, i.e. event 860, MAC TX state machine 800a goes to send state 854 to transmit the packet of the send request. In send state 854, at the completion of transmission (event 861), i.e. when the end of packet is reached, MAC TX state machine 800a reports the successful transmission to LLC TX state machine 600a, and returns to idle state 851 to wait for the next send request.

Figure 8B:
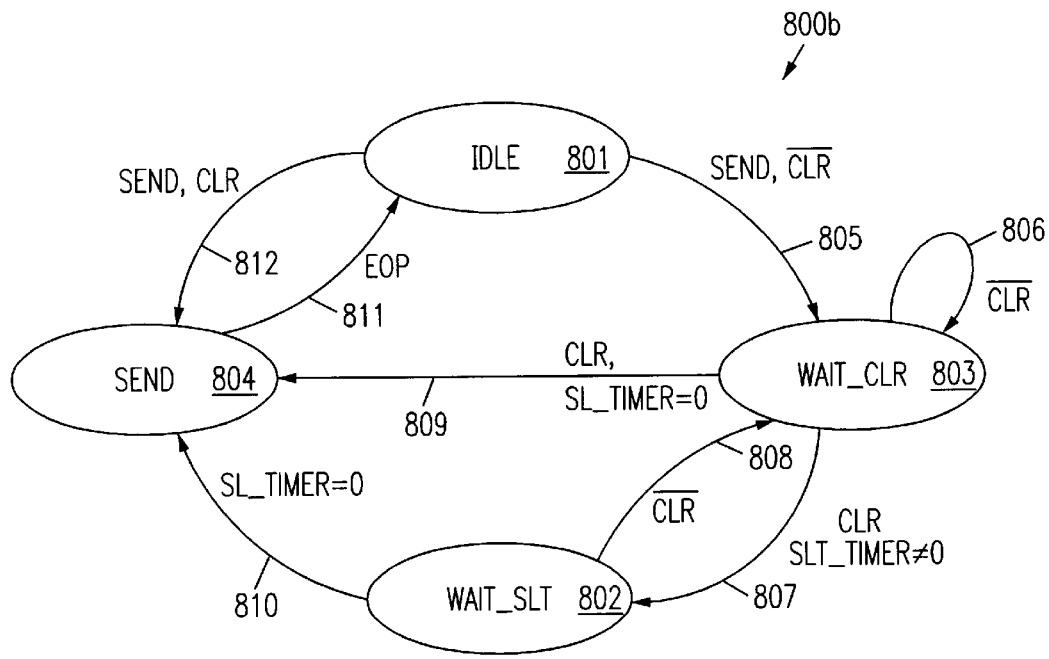
FIG. 8b shows a MAC TX state machine 800b implemented in a base station in one embodiment of the present invention.

FIG. 8b shows MAC TX state machine 800b for a base station. MAC TX state machines 800a and 800b for the base station and the wireless terminal are substantially the same. As shown in FIG. 8b, MAC TX state machine 800b includes four states: (i) idle state 801, in which MAC TX state machine 800b waits for a data packet to transmit, (ii) wait_clear state 803, in which MAC TX state machine 800b wait for a busy channel to clear, (iii) wait_slot state 802, in which MAC TX state machine 800b waits for the assigned time slot, and (iv) send state 804, in which MAC TX state machine 800b transmits a data packet. In idle state 801, if a send request is received and the channel is clear, i.e. event 812, MAC RX state machine 800b is reset, and the send request is executed by MAC TX state machine 800b entering send state 804. (Whether the channel is clear depends on whether MAC TX state machine 800b is in channel_busy state 512 or 522, or channel_clear state 502, 513 or 523). Alternatively, if the send request arrives when the channel is busy, i.e. event 805, MAC TX state machine 800b enters wait_clear state 803. In wait_clear state 803, to avoid collisions when the channel becomes clear, a random time slot number (0–10) is picked, and a slot timer is set based on the picked slot number. If the channel becomes clear prior to the slot timer times out, MAC TX state machine 800b goes to wait_slot state 802. In wait_slot state 802, if the channel becomes busy again (event 808), MAC TX state machine 800b returns to wait_clear state 803; otherwise, when the slot timer times out, i.e. event 810, MAC TX state machine 800b goes to send state 804 to transmit the packet of the send request. In send state 804, at the completion of transmission (event 811), i.e. when the end of packet is reached, MAC TX state machine 800b reports the successful transmission to LLC TX state machine, and returns to idle state 801 to wait for the next send request.

Figure 9:
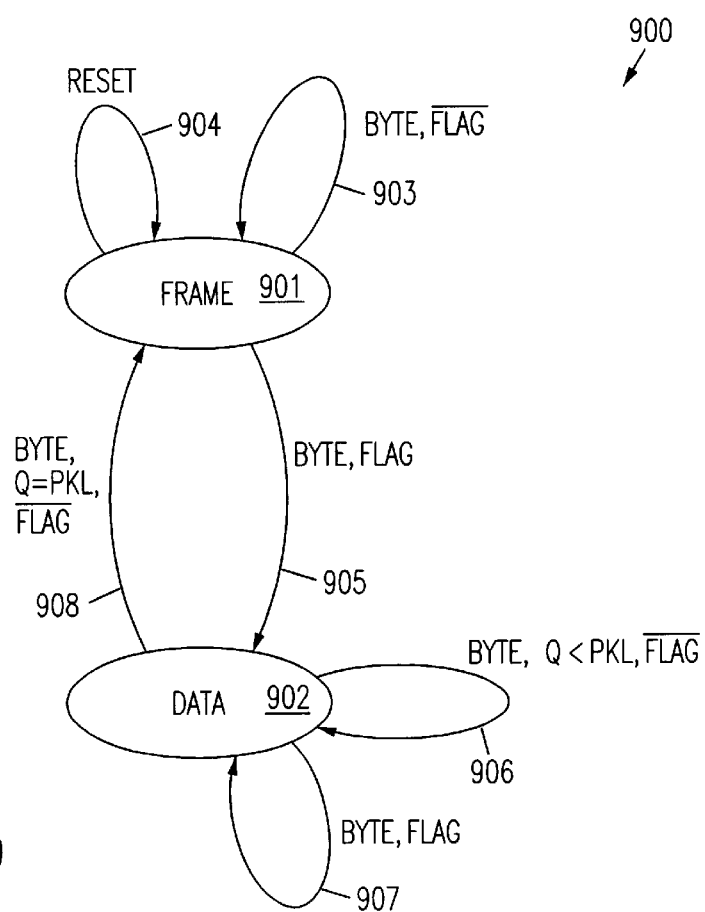
FIG. 9 shows an MAC RX state machine 900, which is implemented in either a base station or a wireless terminal, in one embodiment of the present invention.

FIG. 9 shows a MAC RX machine 900, which is the same state machine used in both a wireless terminal and a base station. MAC RX state machine 900 has only two states: (i) frame state 901, in which both frame byte and 402b and message length field 403 are identified, and (ii) data state 902, in which the remainder of the packet is handled. MAC RX state machine 900 remains in frame state 901 (event 903) until both frame byte 402b and message length field 403 are identified (event 905). At that point MAC RX state machine 900b places the flag bytes in a packet buffer and enters and data state 902.

In data state 902, the bytes received are accumulated in a packet buffer, while frame byte 402b is continually sought for possible FM capture effect (i.e. event 906). If frame byte 402b and the next byte (i.e. message length field 403) are identified, an FM capture of the receiver has occurred, MAC RX state machine 900 flushes the packet buffer and copies both frame byte 402b and the packet length in message length field 403 into the packet buffer and queues the incoming byte for this new packet. Otherwise, when the bytes accumulated in the packet buffer reaches the packet length, the current packet is deemed successfully received. MAC RX state machine 900 passes the packet buffer to either LLC RX state machine 700a or LLC RX state machine 700b, as appropriate, and returns to frame state 901.

The above detailed descriptions are provided to illustrate the specific embodiments of the present invention and is not intended to be limiting. Numerous modifications and variations within the scope of the present invention are possible. The present invention is defined by the appended claims hereto.

We claim:

1. A wireless data network, comprising:
   a plurality of mobile wireless terminals, each wireless terminal capable of transmitting a modulated radio signal of a predetermined modulation and a predetermined frequency over a predetermined range;
   a broadcast station capable of transmitting over a predetermined service area to said mobile wireless stations; and
   a plurality of base stations distributed over said predetermined service area, each base station including a radio signal transceiver and serving a local service area within said predetermined range, such that when two of said wireless terminals transmit simultaneously within the local service area of one of said base stations, said radio signal transceiver of said base station locks onto the stronger radio signal of the two wireless terminals received by said base station.

2. A wireless data network as in claim 1, wherein each of said mobile wireless terminals transmits said modulated radio signal in accordance with an ALOHA protocol.

3. A wireless data network as in claim 1, wherein each of said wireless terminals transmits said modulated radio signal in accordance with a carrier-sensing multiple-access (CSMA) protocol.

4. A wireless data network as in claim 1, wherein said base stations in said service area receive from said wireless terminals radio signals modulated to transmit in the same frequency channel.

5. A wireless data network as in claim 1, wherein said mobile wireless terminals transmit said modulated radio signal without designating a recipient base station.

6. A wireless data network as in claim 1, wherein said modulated radio signal is received by more than one base station.

7. A wireless data network as in claim 1, wherein when one of said base stations receives a data packet encoded in said modulated radio signal from one of said wireless terminals, said base station sends an acknowledgement packet after a delay.

8. A wireless data network as in claim 7, wherein said delay is computed according to the signal strength of said modulated radio signal.

9. A wireless data network as in claim 7, wherein said delay is computed in accordance with a binary exponential backoff algorithm.

10. A wireless data network as in claim 1, further comprising a network control center coupled to each of said base stations, said wireless data network allowing a data packet to be sent between two of said wireless terminals, such that when said data packet is sent, said data packet is first relayed by one of said base stations over a data link to said network control center.

11. A wireless data network as in claim 10, wherein said data link comprises a wireless data link.

12. A wireless data network as in claim 10, wherein said data link comprises a wired data link.

13. A wireless data network as in claim 1, wherein each base station comprises:
   a data buffer;
   means for decoding said modulated signal to provide a bit steam;
   means, coupled to receive said bit stream, for detecting a preamble of a data packet in said bit stream; and
   means, coupled to said data buffer, for storing said preamble and subsequent bits of said bit stream into a data buffer, when said preamble is detected.

14. A wireless data network, comprising:
   a plurality of mobile wireless terminals, each wireless terminal capable of transmitting a modulated radio signal of a predetermined modulation and a predetermined frequency over a predetermined range, each of said wireless terminals transmits said modulated radio signal in accordance with a carrier-sensing multiple-access (CSMA) protocol; and
   a plurality of base stations distributed over a predetermined service area, each base station including a radio signal transceiver and serving a local service area within said predetermined range, such that when two of said wireless terminals transmit simultaneously within the local service area of one of said base stations, said radio signal transceiver locks onto the stronger radio signal of the two wireless terminals received by said station, wherein said wireless terminals each include a circuit for sensing the received signal strength of radio transmissions at said predetermined frequency, said CSMA protocol including a threshold power value, such that when said circuit of one of said wireless terminals sensed said received signal strength to exceed said threshold power value, said wireless terminal refrains from transmitting.

15. A wireless data network as in claim 14, wherein said threshold power value is adaptively adjusted over time.

16. A wireless data network as in claim 14, wherein said threshold power value is adaptively adjusted according to the overall background noise level in the vicinity of said wireless terminal.

17. A wireless data network as in claim 14, wherein said threshold power value is adaptively adjusted according to the traffic in the vicinity of said wireless terminal.

18. A wireless data network, comprising:
   a plurality of mobile wireless terminals, each wireless terminal capable of transmitting a modulated radio signal of a predetermined modulation and a predetermined frequency over a predetermined range; and
   a plurality of base stations distributed over a predetermined service area, each base station including a radio signal transceiver and serving a local service area within said predetermined range, such that when two of said wireless terminals transmit simultaneously within the local service area of one of said base stations, said radio signal transceiver locks onto the stronger radio signal of the two wireless terminals received by said base station, wherein said wireless data network includes two-way paging as an application.

19. A wireless data network, comprising:
   a plurality of mobile wireless terminals, each wireless terminal capable of transmitting a modulated radio signal of a predetermined modulation and a predetermined frequency over a predetermined range; and
   a plurality of base stations distributed over a predetermined service area, each base station including a radio signal transceiver and serving a local service area within said predetermined range, such that when two of said wireless terminals transmit simultaneously within the local service area of one of said base stations, said radio signal transceiver locks onto the stronger radio signal of the two wireless terminals received by said base station, wherein when one of said base stations receives a data packet encoded in said modulated radio signal from one of said wireless terminals, said base station sends an acknowledgement packet after a delay, and wherein said base station receives packets from other base stations, said base station aborting sending said acknowledgement packet, when said base station receives a control packet being an acknowledgement packet acknowledging said data packet prior to said delay expires.

20. A wireless data network comprising:
a plurality of mobile wireless terminals, each wireless terminal capable of transmitting a modulated radio signal of a predetermined modulation and a predetermined frequency over a predetermined range;
a broadcast station capable of transmitting over a predetermined service area to said mobile wireless stations; and
a plurality of base stations distributed over said predetermined service area, each base station including a radio signal transceiver and serving a local service area within said predetermined range, such that when two of said wireless terminals transmit simultaneously within the local service area of one of said base stations, said radio signal transceiver locks onto the stronger radio signal of the two wireless terminals received by said base station wherein when one of said base stations receives a data packet encoded in said modulated radio signal from one of said wireless terminals, said base station sends an acknowledgment packet after a delay, said delay being randomly selected.

21. A method in a wireless data network, comprising the steps of:
providing a plurality of mobile wireless terminals, each wireless terminal capable of transmitting a modulated radio signal of a predetermined modulation and a predetermined frequency over a predetermined range;
providing a broadcast station capable of transmitting over a predetermined service area to said mobile wireless terminals; and
distributing over said predetermined service area a plurality of base stations, each including a radio signal transceiver, each base station being adapted to serve a local service area less than said predetermined range, such that when two of said wireless terminals transmit simultaneously within the local service area of one of said base stations, said radio signal transceiver locks onto the stronger radio signal of the two wireless terminals received by said base station.

22. A method as in claim 21, further comprising the step of requiring said wireless terminals to transmit said modulated radio signal in accordance with an ALOHA protocol.

23. A method as in claim 21, further comprising the step of requiring said wireless terminals to transmit said modulated radio signal in accordance with a carrier-sensing multiple-access (CSMA) protocol.

24. A method as in claim 21, wherein said base stations in said service area and said wireless terminals radio signals communicate using a common predetermined frequency channel.

25. A method as in claim 21, wherein said mobile wireless terminals transmit said modulated radio signal without designating a recipient base station.

26. A method as in claim 21, wherein said modulated radio signal is received by more than one base station.

27. A method as in claim 21, further comprising the step of, when one of said base stations receive a data packet from one of said wireless terminals, sending from said base station an acknowledgement packet after a delay.

28. A method as in claim 27, wherein said delay is computed according to the signal strength of said modulated radio signal.

29. A method as in claim 27, wherein said delay is computed in accordance with a binary exponential backoff algorithm.

30. A method as in claim 21, further comprising the step of providing a network control center coupled to each of said base stations, said wireless data network allowing a data packet to be sent between two of said wireless terminals, such that when said data packet is sent, said data packet is first relayed by one of said base stations over a data link to said network control center.

31. A method as in claim 30, wherein said data link comprises a wireless data link.

32. A method as in claim 30, wherein said data link comprises a wired data link.

33. A method as in claim 21, wherein each base station comprises the steps of:
decoding said modulated signal to provide a bit stream;
detecting a preamble of a data packet in said bit stream; and
storing said preamble and subsequent bits of said bit stream into a data buffer as said data packet, when said preamble is detected.

34. A method in a wireless data network, comprising the steps of:
providing a plurality of mobile wireless terminals, each wireless terminal capable of transmitting a modulated radio signal of a predetermined modulation and a predetermined frequency over a predetermined range, said wireless terminals transmitting said modulated radio signal in accordance with a carrier-sensing multiple-access (CSMA) protocol; and
distributing over a predetermined service area a plurality of base stations, each including a radio signal transceiver, each base station being adapted to serve a local service area within said predetermined range, such that when two of said wireless terminals transmit simultaneously within the local service area of one of said base stations, said radio signal transceiver locks onto the stronger radio signal of the two wireless terminals received by said base station, wherein said wireless terminals each sense the received signal strength of radio transmissions at said predetermined frequency, said CSMA protocol including a threshold power value, such that when said circuit of one of said wireless terminals senses said received signal strength to exceed said threshold power value, said wireless terminal refrains from transmitting.

35. A method as in claim 34, further comprising the step of adaptively adjusting said threshold power value over time.

36. A method as in claim 34, further comprising the step of adaptively adjusting said threshold power according to the overall background noise level in the vicinity of said wireless terminal.

37. A method as in claim 34, further comprising the step of adaptively adjusting said threshold power value according to traffic in the vicinity of said wireless terminal.

38. A method in a wireless data network, comprising the steps of:
providing a plurality of mobile wireless terminals, each wireless terminal capable of transmitting a modulated radio signal of a predetermined modulation and a predetermined frequency over a predetermined range; and distributing over a predetermined service area a plurality of base stations, each including a radio signal transceiver, each base station being adapted to serve a local service area within said predetermined range, such that where two of said wireless terminals transmit simultaneously within the local service area of one of said base stations, said radio signal transceiver locks onto the stronger radio signal of the two wireless terminals received by said base station, wherein said wireless data network includes two-way paging as an application.

39. A method in a wireless data network, comprising the steps of:

providing a plurality of mobile wireless terminals, each wireless terminal capable of transmitting a modulated radio signal of a predetermined modulation and a predetermined frequency over a predetermined range; and distributing over a predetermined service area a plurality of base stations, each including a radio signal transceiver, each base station being adapted to serve a local service area within said predetermined range, such that when two of said wireless terminals transmit simultaneously within the local service area of one of said base stations, said radio signal transceiver locks onto the stronger radio signal of the two wireless terminals received by said base station, wherein when one of said base stations receive a data packet from one of said wireless terminals, said base station sends an acknowledgement packet after a delay, and wherein said base station receives packets from other base stations, said base station aborting sending said acknowledgement packet, when said base station receives a control packet being an acknowledgement packet acknowledging said data packet prior to said delay expires.

40. A method comprising the steps of:

providing a plurality of mobile wireless terminals, each wireless terminal capable of transmitting a modulated radio signal of a predetermined modulation and a predetermined frequency over a predetermined range;

providing a broadcast station capable of transmitting over a predetermined service area to said mobile wireless terminals; and distributing over said predetermined service area a plurality of base stations, each including a radio signal transceiver, each base station being adapted to serve a local service area within said predetermined range, such that when two of said wireless terminals transmit simultaneously within the local service area of one of said base stations, said radio signal transceiver locks onto the stronger radio signal of the two wireless terminals received by said base station when one of said base stations receive a data packet from one of said wireless terminals, sending from said base station an acknowledgment packet after a delay, said delay being randomly selected.

* * * * *